United States Patent Office 3,555,060
Patented Jan. 12, 1971

3,555,060
ORGANOTHIO-, ORGANOCARBOXY-, AND ORGANOTHIO-ORGANOCARBOXYSTANNOXANES
Samuel Hoch, Brooklyn, N.Y., assignor to Tenneco Chemicals, Inc., a corporation of Delaware
No Drawing. Filed Oct. 5, 1967, Ser. No. 672,985
Int. Cl. C07f 7/22; C08f 45/62
U.S. Cl. 260—429.7
4 Claims

ABSTRACT OF THE DISCLOSURE

Basic organotin compounds that have the structure

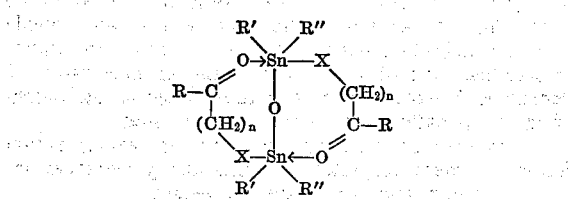

wherein each X is oxygen or sulfur; each R is an alkyl group having 4 to 17 carbon atoms, an alkoxy group having 1 to 18 carbon atoms, an aralkyl group or the group

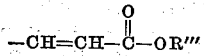

each R' and R" is an alkyl group having 4 to 8 carbon atoms, an alkaryl group, an aralkyl group, a cycloalkyl group or an aryl group; R''' is an alkyl group having from 1 to 18 carbon atoms, a cycloalkyl group, or an aralkyl group; and each n is an integer in the range of zero to one are prepared by reacting a compound having the structure

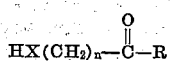

with a stoichiometric excess of an organotin oxide having the structure

in the presence of an inert, non-polar solvent. Illustrative of these compounds are basic dibutyltin-bis-(isooctyl maleate), basic dibutyltin-bis-(isooctyl thioglycolate), and basic dibutyltin dilaurate.

These basic organotin compounds are superior to the corresponding neutral compounds as heat and light stabilizers for vinyl halide resin compositions.

---

This invention relates to organotin compounds. More particularly, it relates to basic organotin compounds and to resinous compositions stabilized therewith.

A number of organotin compounds are known to be good heat stabilizers for vinyl halide resin compositions. None of these compounds is entirely satisfactory for this use because some of them are not stable and start to decompose to form inactive crystalline products on standing for as little as one day at room temperature; others are not readily soluble or are insoluble in the commonly-used organic solvents; and still others are characterized by undesirable odors.

In accordance with the present invention, it has been found that certain basic organotin compounds are excellent heat and light stabilizers for vinyl halide resin compositions. They are stable on prolonged storage, are readily soluble in hydrocarbons and other solvents, and do not have unpleasant odors.

The basic organotin compounds of this invention are chelate complexes that have the structure

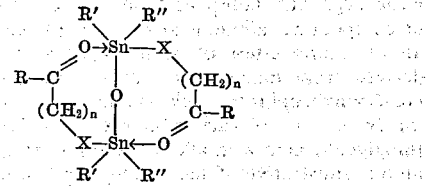

wherein each X represents oxygen or sulfur; each R represents an alkyl group having 4 to 17 carbon atoms, an alkoxy group having 1 to 18 carbon atoms, an aralkyl group, or the group

each R' and R" represents an alkyl group having from 4 to 8 carbon atoms, an alkaryl group, an aralkyl group, a cycloalkyl group, or an aryl group; R''' represents an alkyl group having 1 to 18 carbon atoms, a cycloalkyl group, or an aralkyl group; and each n represents an integer in the range of zero to one. Illustrative of these chelate complexes are basic dibutyltin dilaurate, which has the structure

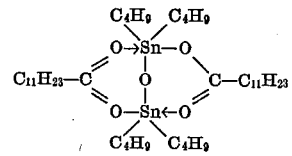

basic dibutyltin bis-(isooctyl thioglycolate), which has the structure

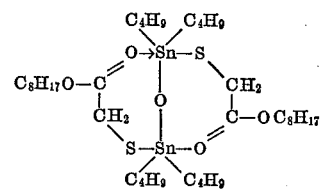

and basic dibutyltin bis-(isooctyl maleate), which has the structure

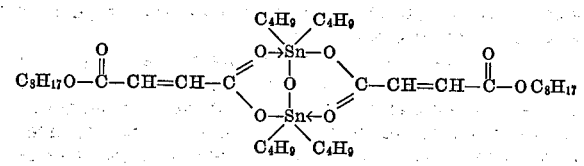

The basic organotin compounds of this invention may be prepared by the reaction of a compound having the structure

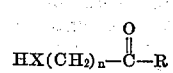

wherein X, R, and n have the aforementioned significance with a stoichiometric excess of an organotin oxide.

The organotin oxides that may be used are those having the structure R'R"SnO, wherein R' and R" have the aforementioned significance. The preferred organotin oxides for use in the preparation of the basic organotin compounds include dibutyltin oxide, dihexyltin oxide, dioctyltin oxide, ditolyltin oxide, dibenzyltin oxide, dicyclohexyltin oxide, diphenyltin oxide, butylphenyltin oxide, butyloctyltin oxide, butylbenzyltin oxide, and the like. Particularly satisfactory results have been obtained using dibutyltin oxide.

The compounds having the structure

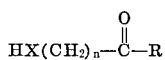

that are reacted with an organotin oxide to form the novel basic organotin compounds include the following groups of compounds: alkanoic acids having from 5 to 18 carbon atoms; mono esters of dicarboxylic acids, such as those derived from maleic acid, succinic acid, or endomethylenetetrahydrophthalic acid (nadic acid) and alkanols having from 1 to 18 carbon atoms; thioacids; and esters of thioglycolic acid with alkanols having from 1 to 18 carbon atoms. Illustrative of these compounds are the following: pelargonic acid, capric acid, myristic acid, stearic acid, mono-n-propyl maleate, monoisooctyl maleate, mono-n-decyl maleate, monoisooctyl endomethylenetetrahydrophthalate, monoisopropyl succinate, monoisohexyl adipate, propyl thioglycolate, isooctyl thioglycolate, n-decyl thioglycolate, n-dodecyl thioglycolate, and mixtures thereof.

The reaction between the organotin oxide and the carbonyl compounds to form the basic organotin compounds is usually carried out in an inert, non-polar solvent that will form an azeotrope with water. Suitable solvents include hydrocarbons, such as heptane, n-decane, isooctane, benzene, toluene, and xylene, and ketones, such as acetone. The amount of solvent used is that which will provide a reaction mixture containing from about 20 percent to about 60 percent by weight of the solvent.

The basic organotin compounds of this invention may be prepared by heating the reaction mixture, which comprises the reactants and solvent, at its reflux temperature, which is usually between about 75° C. and 135° C. until substantially all of the water formed as a by-product of the reaction has been removed by azeotropic distillation. When the reaction has been completed, the reaction mixture is usually a clear solution of the basic organotin compound in the solvent. The solvent is then removed by distillation under atmospheric or subatmospheric pressure.

The amount of the organotin oxide that is used is about 105 percent to 400 percent of the amount required to form the corresponding neutral organotin compound. That is, a stoichiometric excess of about 5 percent to about 300 percent of the organotin oxide is used, with particularly satisfactory results being obtained when a stoichiometric excess of 10 percent to 100 percent is used. The product obtained is usually a mixture of neutral and basic organotin compounds, with the amount of the basic compounds present largely dependent upon the amount of organotin oxide that is reacted.

The entire amount of organotin oxide may be present amounts of the reactants may be present at the start of the reaction and additional amounts of the oxide added to the reaction mixture during the course of the reaction, or the oxide may be added to a solution of the neutral organotin compound to form the basic compound.

The vinyl halide resins that may be stabilized with the basic organotin compounds of this invention are the resinous products obtained by the polymerization of a vinyl halide in the presence or absence of a copolymerizable monomer. The term "vinyl halide resin" as used herein includes vinyl halide homopolymers, such as polyvinyl chloride and polyvinyl bromide, as well as vinyl halide copolymers, including those formed by the polymerization of a vinyl halide with a comonomer such as vinyl acetate, vinyl butyrate, vinylidene chloride, styrene, methyl methacrylate, dialkyl fumarate or maleate, and the like. The copolymers useful in the practice of this invention are those that contain at least 70 percent of vinyl halide units and up to 30 percent of the comonomer units. The invention is also applicable to mixtures of vinyl halide resins in a major proportion with a minor proportion of another synthetic resin, such as chlorinated polyethylene, polyacrylate and polymethacrylate esters, and terpolymers of acrylonitrile, butadiene, and styrene. In addition to the vinyl halide resin and the stabilizer, the compositions may contain plasticizers such as dioctyl phthalate, dibutyl sebacate, tricresyl phosphate, and octyl diphenyl phosphate, lubricants, other heat and light stabilizers such as epoxidized oils and polyhydric alcohols, pigments, dyes, extenders, solvents, and other resin additives in the amounts ordinarily employed for the purpose indicated.

Only a small amount of the stabilizer need be present in the vinyl halide resin compositions of this invention. It has been found that as little as 1 percent of the stabilizer, based on the weight of the composition, will bring about an appreciable improvement in the heat and light stability of the composition. Ten percent or more of the stabilizer can be used, but these larger amounts generally do not provide further improvement in the properties of the resinous composition and for this reason are not ordinarily used. While the amount of the stabilizer that will provide optimum stability depends upon such factors as the choice of stabilizer and of vinyl halide resin, in most cases 1.5 percent to 6 percent of the stabilizer, based on the weight of the vinyl halide resin composition, is used.

The invention is further illustrated by the examples that follow. In these examples, all parts and percentages are parts by weight and percentages by weight.

EXAMPLE 1

A mixture of 32.6 parts (0.25 mole) of isooctanol, 12.3 parts (0.125 mole) of maleic anhydride, 20.5 parts (0.125 mole) of endomethylene-tetrahydrophthalic anhydride (nadic anhydride), and 150 parts of toluene was heated at its reflux temperature (115°–120° C.) for one hour. To the resulting monoisooctyl maleate-monoisooctyl endomethylenetetrahydrophthalate solution at 90° C. was added 31.1 parts (0.125 mole) of dibutyltin oxide. The reaction mixture was heated at its reflux temperature (115°–120° C.) until 2.2 ml. of water had been collected by azeotropic distillation and the reaction mixture was clear. The addition of 31.1 part portions of dibutyltin oxide was repeated until a total of 124.4 parts (0.50 mole) of the oxide had been added, with the reaction mixture being heated at its reflux temperature until each portion of the oxide had reacted. In this way the isooctyl esters were reacted with an amount of dibutyltin oxide that represented an excess of 300 percent over the amount required for the formation of neutral dibutyltin-isooctyl maleate-isooctyl endomethylenetetrahydrophthalate.

Toluene was removed from the reaction mixture by distillation under atmospheric pressure, and the residue was filtered.

The basic dibutyltin-isooctyl maleate-isooctyl endomethylenetetrahydrophthalate obtained, which contained 31.7 percent Sn, was a clear viscous liquid when hot and became a waxy solid on cooling. Infrared analysis indicated that the compound is a chelate complex.

EXAMPLE 2

A mixture of 33.0 parts (0.25 mole) of isooctanol, 24.6 parts (0.25 mole) of maleic anhydride, and 100 grams of toluene was heated at its reflux temperature for one hour. To the resulting monoisooctyl maleate solution was added 31.1 parts (0.125 mole) of dibutyltin oxide. The reaction mixture was heated at its reflux temperature until 2.2 parts of water had been collected by azeotropic distillation and the reaction mixture was clear. The addition of 31.1 part portions of dibutyltin oxide was repeated until a total of 93.3 parts (0.375 mole) of the oxide had been added, with the reaction mixture being heated at its reflux temperature until each portion of the oxide had been reacted. In this way monoisooctyl maleate was reacted with an amount of dibutyltin oxide that represented an excess of 200 percent over the amount required for the formation of neutral dibutyltin-bis-(isooctyl maleate).

Toluene was removed from the reaction mixture by distillation under atmospheric pressure, and the residue was filtered.

The basic dibutyltin-bis-(isooctyl-maleate) obtained, which contained 30.0 percent Sn, became a waxy solid on cooling.

EXAMPLE 3

To a solution of monoisooctyl maleate in toluene, which was prepared by heating together 66.0 parts (0.5 mole) of isooctanol, 49.2 parts (0.5 mole) of maleic anhydride, and 100 parts of toluene, was added 74.6 parts (0.3 mole) of dibutyltin oxide (an excess of 20 percent over the amount required for the formation of the neutral compound). The reaction mixture was heated at its reflux temperature until all of the dibutyltin oxide had reacted, and then heated to distill off the toluene and filtered. The basic dibutyltin-bis-(isooctyl maleate) obtained, which contained 19.3 percent Sn, was a clear, slightly yellow liquid.

EXAMPLE 4

To a solution of mono-n-propyl maleate in benzene which was prepared by heating together at 70°–80° C. 44.0 parts (0.731 mole) of n-propanol, 71.6 parts (0.731 mole) of maleic anhydride, and 100 parts of benzene, was added 99 parts (0.40 mole) of dibutyltin oxide (an excess of 20 percent over the amount required for the formation of the neutral compound). The reaction mixture was heated at its reflux temperature (90° C.) until all of the dibutyltin oxide had reacted and 6.5 parts of water had been collected. It was then heated to distill off the benzene and filtered. The basic dibutyltin-bis-(n-propyl maleate) obtained, which contained 23.9 percent Sn, was a clear, slightly yellowish liquid.

EXAMPLE 5

A reaction mixture containing 52.0 parts (0.25 mole) of isooctyl thioglycolate, 38.9 parts (0.156 mole) of dibutyltin oxide, and 100 parts of toluene was heated at its reflux temperature until all of the dibutyltin oxide had reacted. The amount of dibutyltin oxide present was 25 percent more than the amount required for the formation of the neutral compound.

The reaction mixture was heated to distill off the toluene and filtered. The basic dibutyltin bis-(isooctyl thioglycolate) obtained, which contained 21.2 percent Sn, was a clear, yellowish liquid.

EXAMPLE 6

A reaction mixture containing 487 parts (2.364 moles) of isooctyl thioglycolate, 76.7 parts (0.589 mole) of isooctanol, 577 parts (0.589 mole) of maleic anhydride, and 1220 parts of benzene was heated at its reflux temperature (85° C.) for one hour. To this mixture at 60° C. was added 404 parts (1.623 moles) of dibutyltin oxide. The amount of dibutyltin oxide added was 10 percent more than the amount required for the formation of the neutral compound.

The reaction mixture was heated at its reflux temperature (80°–85° C.) until all of the dibutyltin oxide had reacted and 23 parts of water had been collected. It was then heated to 80° C. under a vacuum of 30–40 mm. to remove the benzene and filtered. The basic dibutyltin-isooctyl maleate-isooctyl thioglycolate obtained, which contained 19.3 percent Sn, was a clear, light yellow liquid.

EXAMPLE 7

A reaction mixture containing 409 parts (1.985 moles) of isooctyl thioglycolate, 110.7 parts (0.85 mole) of isooctanol, 83.3 parts (0.85 mole) of maleic anhydride, and 1220 parts of of benzene was heated at its reflux temperature for one hour. To this mixture at 60° C. was added 352.5 parts (1.418 moles) of dibutyltin oxide. The reaction mixture was heated at 80°–85° C. until 23 parts of water had been collected. An additional 70.5 parts (0.283 mole) of dibutyltin oxide was added and the reaction mixture was heated at 85° C. until it had become clear. The total amount of dibutyltin oxide used was 20 percent more than that required for the formation of the neutral compound.

The reaction mixture was heated to 80° C. under a vacuum of 30–40 mm. to remove the benzene and then filtered. The basic dibutyltin-isooctyl maleate-isooctyl thioglycolate obtained, which contained 20.2 percent Sn, was a clear, light yellow liquid.

EXAMPLE 8

A mixture of 63.1 parts (0.1 mole) of dibutyltin laurate which contained 18.3 percent Sn, 24.9 parts (0.1 mole) of dibutyltin oxide, and 100 parts of toluene was heated at its reflux temperature (115°–120° C.) until all of the dibutyltin oxide had reacted and the mixture had become clear. The mixture was heated under atmospheric pressure until all of the toluene had been removed and then filtered. The basic dibutyltin dilaurate obtained, which was a clear solution, contained 26.1 percent Sn.

EXAMPLE 9

A series of stabilized polyvinyl chloride resin compositions was prepared by the following procedure:

To a mixture of 100 parts of polyvinyl chloride (Tenneco 10R), 15 parts of an acrylonitrile-butadiene-styrene terpolymer (Blendex 401), 4 parts of polyacrylonitrile (K–120N), 1.35 parts of glyceryl monoricinoleate, 0.5 part of stearyl stearate, and 0.001 part of blue dye was added 2 parts of one of the stabilizers of this invention or the corresponding neutral organotin compound. The novel stabilizers that were used were the products of Examples 3, 4, 6, and 7.

The mixtures were blended at room temperature and then charged to a two-roll, steam-heated mill whose roll surface was maintained at 340° F. The mixtures were milled for 5 minutes and then removed from the mill as flexible, homogeneous sheets 45 mils thick. The heat stability of the compositions was determined by placing 1 x 1 inch specimens that had been cut from the milled sheets in forced-circulation ovens at 350° F. and at 375° F. and removing specimens periodically until degradation was complete as indicated by color change.

In each case the specimens containing the basic organotin compound as stabilizer were superior in early color hold (10 to 50 minutes at both temperatures) to those containing the corresponding neutral compound.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. The basic organotin compound that has the structure

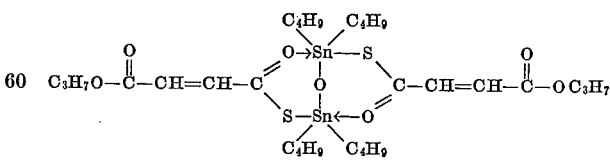

2. The basic organotin compound that has the structure

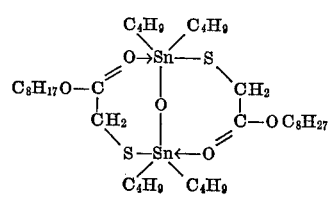

3. The basic organotin compound that has the structure

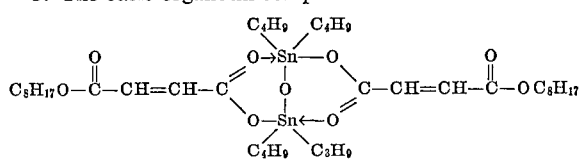

4. The basic organotin compound that has the structure

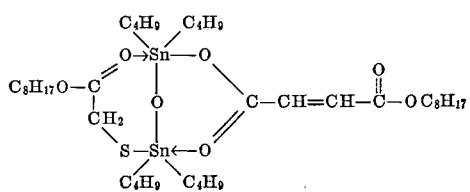

References Cited

UNITED STATES PATENTS

| 2,789,102 | 4/1957 | Weinberg | 260—429.7X |
| 3,019,247 | 1/1962 | Mack et al. | 260—429.7 |
| 3,396,185 | 8/1968 | Hechenbleikner et al. | 260—429.7 |

OTHER REFERENCES

Fucs, Chemical Abstracts, vol. 61 (1964), p. 5046.

Krizhanckii et al., Akademiïa Nauk S.S.S.R. (Dokl.), vol. 160 (1965), pp. 1121–3.

TOBIAS E. LEVOW, Primary Examiner

W. F. W. BELLAMY, Assistant Examiner

U.S. Cl. X.R.

260—45.75